United States Patent [19]
Rotzoll

[11] Patent Number: 5,790,946
[45] Date of Patent: Aug. 4, 1998

[54] WAKE UP DEVICE FOR A COMMUNICATIONS SYSTEM

[76] Inventor: Robert R. Rotzoll, 120 W. Rockford St., Meridian, Id. 83706

[21] Appl. No.: 424,827

[22] Filed: Apr. 19, 1995

Related U.S. Application Data

[63] Continuation of Ser. No. 92,147, Jul. 15, 1993, abandoned.

[51] Int. Cl.⁶ .................................................... H04B 1/16
[52] U.S. Cl. ................................ 455/343; 455/38.3
[58] Field of Search ........................ 342/51, 44, 42, 342/50, 43; 340/825.54, 825.34, 825.59, 825.72, 825.71, 825.58, 825.36, 825.49, 573, 870.02; 455/38.1, 38.2, 38.3, 343, 54.1, 68, 70, 88, 67.1, 151.1, 151.2, 353, 352; 375/377; 370/84

[56] References Cited

U.S. PATENT DOCUMENTS

| | | | |
|---|---|---|---|
| 4,219,851 | 8/1980 | Lemak | 360/40 |
| 4,328,587 | 5/1982 | Mizuno et al. | 375/97 |
| 4,410,789 | 10/1983 | Story | 340/825.72 |
| 4,555,788 | 11/1985 | Merrill | 375/289 |
| 4,724,545 | 2/1988 | Hamada | 455/218 |
| 4,771,283 | 9/1988 | Imoto | 455/352 |
| 4,885,571 | 12/1989 | Pauley et al. | 340/573 |
| 4,961,073 | 10/1990 | Drapac et al. | 455/343 |
| 5,054,052 | 10/1991 | Nonami | 455/343 |
| 5,181,227 | 1/1993 | DeLuca et al. | 455/343 |
| 5,194,860 | 3/1993 | Jones et al. | 340/825.54 |
| 5,245,346 | 9/1993 | Nishimura et al. | 342/42 |
| 5,379,453 | 1/1995 | Tigwell | 455/352 |
| 5,507,040 | 4/1996 | Eaton et al. | 455/343 |
| 5,541,976 | 7/1996 | Ghisler | 455/343 |

FOREIGN PATENT DOCUMENTS

| | | | |
|---|---|---|---|
| 90/11652 | 10/1990 | WIPO | 455/343 |

*Primary Examiner*—Nguyen Vo
*Attorney, Agent, or Firm*—Ozer M. N. Teitelbaum; Robert J. Stern

[57] ABSTRACT

A communication system includes a first communication device for receiving data and a wake up signal. Operation of the first communication device includes an active mode of operation and a sleep mode of operation for reducing power consumption. Further, the system includes a switch for switching the first communication device to and from sleep mode in response to receiving the wake up signal. The system also includes a second communication device for transmitting data to the first device during its active mode, and for transmitting the wake up signal to the first device during its sleep mode.

3 Claims, 4 Drawing Sheets

5,790,946

1

WAKE UP DEVICE FOR A COMMUNICATIONS SYSTEM

This application is a continuation of application Ser. No. 08/092,147 filed Jul. 15, 1993, now abandoned.

FIELD OF THE INVENTION

The present invention relates to a communication system. More particularly, the invention pertains to a multi-mode communication system.

BACKGROUND OF THE INVENTION

Recently, there has been increased research and development with respect to Radio Frequency Identification ("RFID") device tags. These RFID tags essentially comprise small radio transceivers to be attached to a movable object. Coupling an RFID tag to an object has made possible a system for tracking the whereabouts and identification of the object.

Several RFID systems have been developed. Generally, those designs have been relatively large in size, approximating the size of a cigarette package; and, have been generally fabricated using hybrid circuit techniques. Besides their bulky size, those systems require the RFID tag to constantly remain activated.

Recently, there have been several breakthroughs in techniques in the design and manufacture of RFID tags. Examples of these include U.S. patent applications Ser. No. 07/899,777 filed Jun. 17, 1992 now abandoned, Ser. No. 07/921,037 filed Jul. 24, 1992 now abandoned, Ser. No. 07/928,899 filed Aug. 12, 1992 now abandoned, and Ser. No. 08/032,384 filed Mar. 17, 1993 U.S. Pat. No. 5,539,775, all incorporated herein by reference.

It has been a design criteria that those RFID tags be light weight and inexpensive. However, those systems previously have not satisfied the goal of low power consumption. Presently, RFID tags must be active to detect their location, as well as additional information. As such, there is a need to develop an RFID tag communication system having an active mode for receiving and transmitting data and a sleep mode for reducing power consumption.

SUMMARY OF THE INVENTION

In order to achieve the benefits of the present invention, a system is disclosed comprising a first communication device for receiving data and a wake up signal. The first communication device comprises an active mode of operation and a sleep mode of operation for reducing power consumption. Further, the system comprises means for switching the first communication device to and from sleep mode in response to receiving the wake up signal. Further, the system comprises a second communication device for transmitting data to the first device during its active mode, and for transmitting the wake up signal to the first device during its sleep mode.

Moreover, a method is disclosed for reducing the consumption of energy in operating a communication system. The communication system comprises a transmitter, a master receiver, and a wake up receiver. The master receiver has at least an active mode and a sleep mode of operation. The wake up receiver uses substantially less power than the master receiver. Initially, data is transmitted to and received by the master receiver during its active mode. A wake up signal is transmitted to and received by the wake up receiver during the master receiver's sleep mode. It should be noted

2 that the wake up signal comprises a predetermined frequency and a predetermined rate of data transmission. Subsequently, the predetermined frequency and the predetermined rate of data transmission signal are detected. Upon detecting both, the master receiver is enabled for receiving data in response to detecting the wake up signal.

The objects and advantages of the present invention will become apparent to those skilled in the art from the following detailed description read in conjunction with the appended claims and the drawings attached hereto.

BRIEF DESCRIPTION OF THE DRAWINGS

The present invention will be better understood from reading the following description of non-limitative embodiments, with reference to the attached drawings, wherein below.

It should be emphasized that the drawings of the instant application are not to scale but are merely schematic representations and are not intended to portray the specific parameters or the structural details of the invention, which can be determined by one of skill in the art by examination of the information herein.

DETAILED DESCRIPTION OF THE INVENTION

Figure 1:
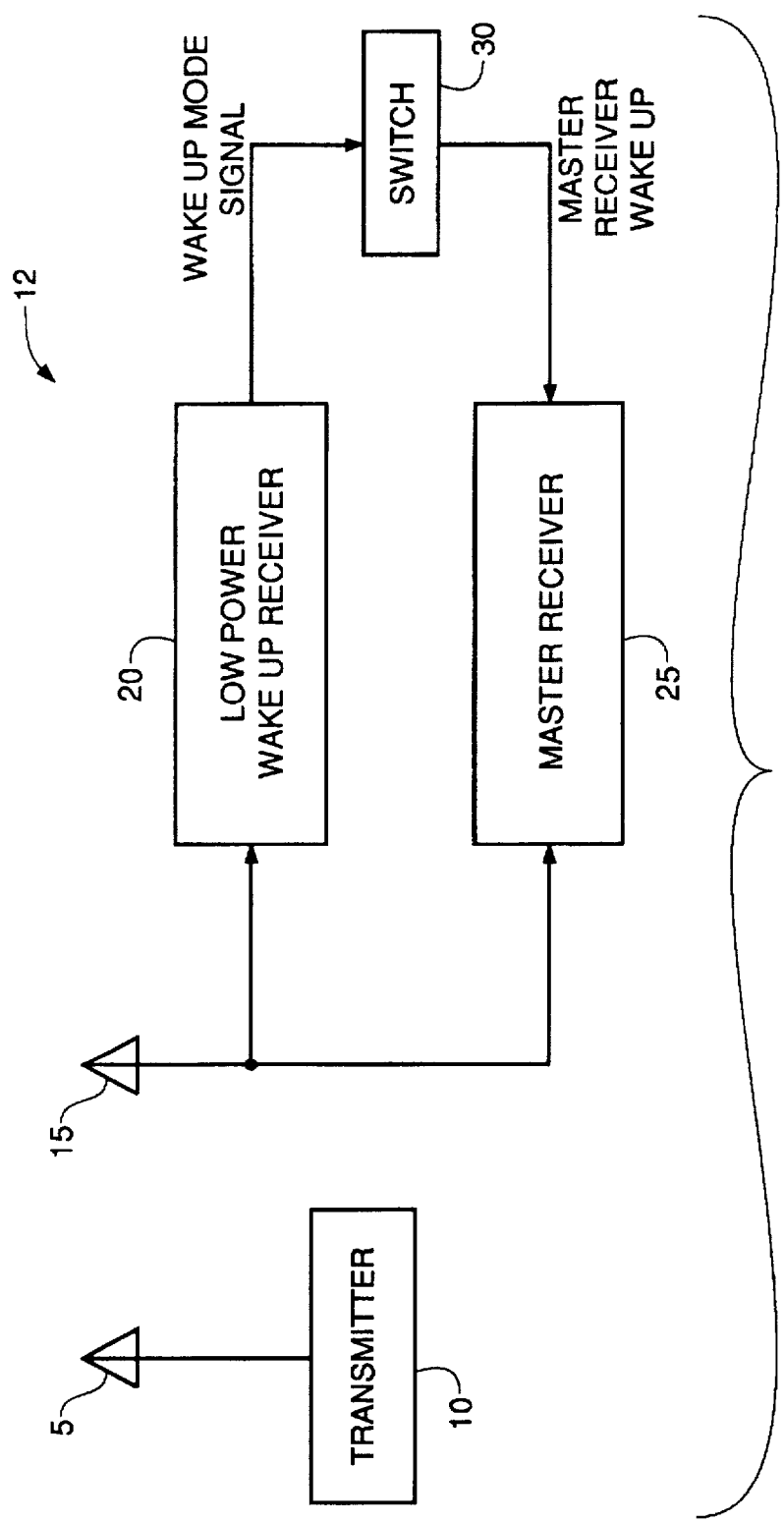
FIG. 1 is an high level architecture of the present invention.

Referring to FIG. 1, a wake up device for a communication system is illustrated. As shown, the system 12 comprises first and second communication devices, a transmitter 10 and a receiver 12. Transmitter 10 is coupled to antenna 5 in order to properly transmit data and a wake up signal to receiver 12. Receiver 12 comprises a wake up receiver 20 and a master receiver 25, which are both coupled to antenna 15. Further, receiver 12 comprises a switch, which enables substantial energy savings. It should be noted that the issue of energy saving with respect to transmitter 10 is not important, as it is not part of an RFID tag, unlike receiver 12 in the preferred embodiment.

To accomplish these energy savings, master receiver 25 comprises at least two modes of operation. In the preferred embodiment, the first mode is referred to as an active mode of operation and the second mode referred to as a sleep mode. Further, wake up receiver 20 requires substantially less power for its operation than master receiver 25.

In the active mode of operation, master receiver 25 functions as a traditional receiver, capable of receiving data transmitted by transmitter 10. By contrast, in order to reduce power consumption during periods of inactivity, master receiver 25 comprises a sleep mode. During sleep mode, master receiver 25 utilizes a minimal amount of energy for biasing purposes. Thus, by utilizing this design scheme, a substantial power savings from receiver 12 can be achieved, which directly corresponds to the life expectancy of battery powered receiver 12. For example, in one receiver design, a 98% power savings has been observed.

Coupled between master receiver 25 and wake up receiver 20, is switch 30. Switch 30 switches master receiver 25 between its modes of operation in response to the arrival of a wake up signal. As such, transmitter 10 transmits a wake up signal to receiver 12, which is ultimately received by wake up receiver 20. Upon detecting the wake up signal, a mode change signal is generated to switch 30. Accordingly, switch 30 changes the mode of operation of master receiver from sleep mode to active mode.

In the preferred embodiment of the present invention, switch 30 only switches master receiver 25 from sleep mode to active mode. Here, upon receiving wake up signal, wake up receiver 20 generates a mode change signal to switch 30. In response, switch 30 senses the mode of operation of master receiver 25. Thus, switch 30 switches master receiver to active mode upon sensing master receiver 25 as being in sleep mode. Contrarily, switch 30 is inactive upon sensing master receiver 25 as being in an active mode of operation. In this embodiment, master receiver 25 further comprises a timing scheme that switches master receiver 25 from active mode to sleep mode. This timing scheme is enabled when a predetermined period passes in master receiver 25 without receiving any data from transmitter 10. The length of the period is dependent on several design criteria including the system's application and environment, as well as the desired probabilities of error. In a further embodiment of the present invention, switch 30, low power receiver 20 and master receiver 25 are all positioned on a radio frequency identification ("RFID") tag.

Figure 2:
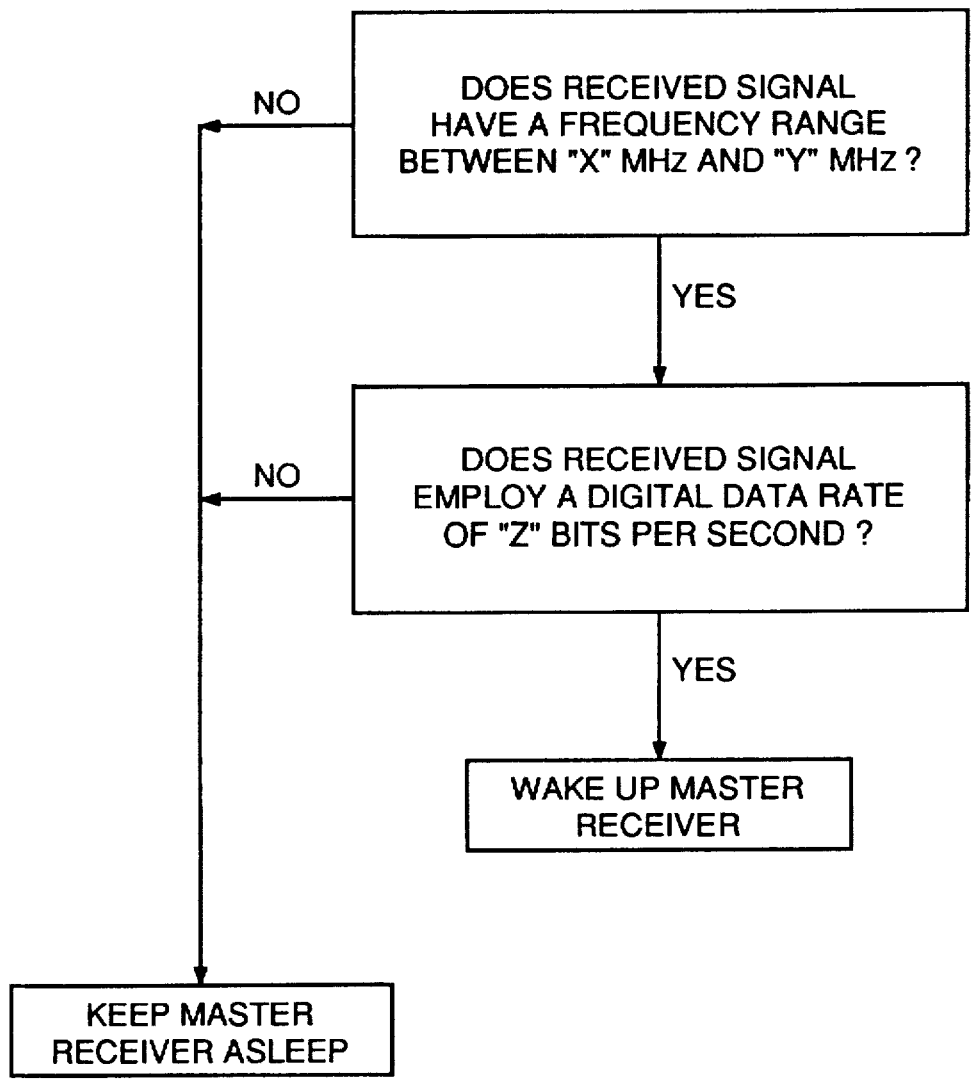
FIG. 2 is a flow chart illustrating the method of the present invention.

Referring to FIG. 2, a flow chart illustrates the method for reducing the consumption of energy in operating a communication system of the present invention employing the architecture described herein. Initially, a wake up signal is transmitted by transmitter 10, and subsequently, the wake up signal is detected by wake up receiver 20. Finally, the mode of operation of master receiver 25 is changed in response to the detection of the wake up signal.

In one embodiment of the present invention, the step of detecting the wake up signal comprises a series of steps. First, a predetermined frequency is detected from the wake up signal. In the event that that frequency is found, a predetermined data rate is detected from the wake up signal. If that data rate is not found, master receiver 25 is kept asleep. In the event that a predetermined data rate of transmission of a certain number of bits per second is found, an output signal is generated. If that the predetermined data rate of transmission is not found, master receiver 25 is kept asleep. This step of generating an output signal further comprises the step of comparing the output signal with a reference voltage. By doing so, switch 30 is enabled upon detecting a predetermined frequency and a predetermined data rate of transmission and master receiver 25 is awakened.

Figure 3:
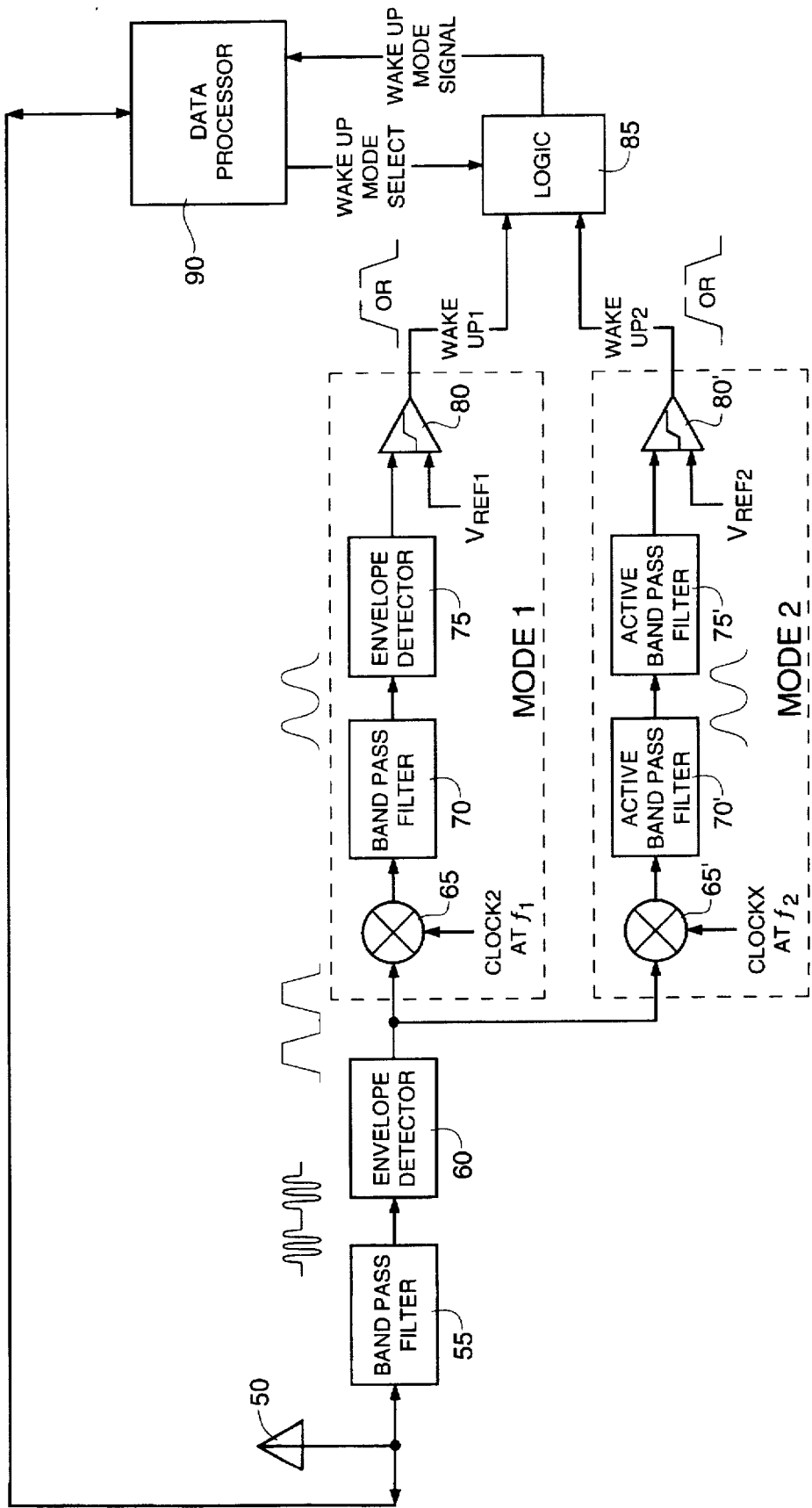
FIG. 3 illustrates a first embodiment of the present invention.

Referring to FIG. 3, a first embodiment of the present invention is depicted. In order to receive a wake up signal, an antenna 50 is coupled with a frequency detector, realized by a first bandpass filter 55 having a bandwidth and a radio frequency ("RF") output. First bandpass filter 55, cooperating with antenna 50, detects the frequency of the wake up signal. To avert the detection of noise as a wake up signal, the bandwidth of first bandpass filter 55 is substantially narrow. Nonetheless, in the preferred embodiment, first bandpass filter 55 must detect a predetermined frequency and a related harmonic.

While the present invention utilizes a narrow bandpass scheme for frequency detection, it should be obvious to one of ordinary skill in the art that the frequency detector can be realized using alternate hardware. For example, in place of a narrow bandpass filter, a generalized filter having an output coupled directly with a comparator would achieve the identical functional purpose when the comparator is also coupled to a frequency reference or source. Another example would be a resonator circuit in place of the narrow bandpass filter.

Coupled to bandpass filter 55 is an envelope detector 60. Upon receiving the RF bandpass output from filter 55, envelope detector 60 demodulates the RF bandpass output into a first Base Band ("BB") signal. Envelope detector 60 achieves this objective in two steps. However, it should be obvious to one of ordinary skill in the art that the functional objective of envelope detector 60 can be realized by alternate means. Initially, envelope detector 60 rectifies the RF bandpass output by means of a rectifier. Subsequently, a low pass filter is employed for filtering the rectified RF bandpass output and forming the first BB signal.

Once the frequency of the wake up signal has been detected, the present invention employs a data rate detector for detecting the rate of data transmission of the incoming signal, which thereby rejects out of data rate signals. As such, this design employs two means for assessing two characteristics of the incoming signal. Thus, by this approach, noise and/or other sources will not falsely trigger the master receiver into waking up.

The data rate detector can be realized by a second bandpass filter 70 having a second bandwidth and a second BB signal as its output. To avert the detection of noise as a wake up signal, the second bandwidth of bandpass filter 70 is a substantially narrow bandwidth. In one embodiment of the present invention, the second bandwidth is substantially narrower than the first bandwidth of the first bandpass filter 55. Therefore, in the preferred embodiment, the second bandwidth need only detect a singular frequency without any harmonics.

While the present invention utilizes the herein described means for data rate detection, it should be obvious to one of ordinary skill in the art that the data rate detector can be realized using alternate hardware. For example, a comparator scheme or resonator circuit could be employed. Further, digital circuitry could also be used to accomplish the same purpose as the data detector described herein.

Further, coupled with second bandpass filter 70 is a second envelope detector 75. In order to detect the data rate of an incoming signal and to ascertain whether it is the wake up signal, second envelope detector 75 generates an output signal corresponding to the second BB signal input received from second bandpass filter 70 by demodulating the second BB signal. Second envelope detector 75 achieves this objective in two steps. However, it should be obvious to one of ordinary skill in the art that the functional objective of second envelope detector 75 can be realized by alternate means. Initially, envelope detector 75 rectifies the second BB signal by means of a rectifier. Subsequently, a low pass filter is employed for filtering the rectified second BB signal. As a result of this architecture, second envelope detector 75 generates an upward ramped step or a downward ramped step as an output signal.

Coupled to second envelope detector 75 is a comparator 80. Comparator 80 is employed to compare the output signal of second envelope detector 75 with a voltage reference. By this arrangement, comparator 80 triggers an internal WAKE_UP1 signal. WAKE_UP1 signal is subsequently fed into control logic 85, which is coupled with a data processor 90, for waking up the master receiver 25.

In an alternate embodiment of the present invention, a second data rate detector is utilized. The second data rate detector, being coupled to the frequency detector, receives the first BB signal generated by the first envelope detector 60. The second data rate detector can be designed in an identical fashion as the first data detector described herein.

By this arrangement, comparator 80 triggers an internal WAKE_UP2 signal which is input into control logic 85, which is coupled with data processor 90, for waking up the master receiver 25. By employing two data rate detectors, the wake up receiver can switch the data rate to be detected from the wake up signal. Here, switching logic 85 in combination with data processor 90 recognize the data rate to be detected from the wake up signal. Subsequently, when a change is necessary, a second data rate is selected as being the data rate to be detected from the wake up signal for the purpose of waking master receiver 25.

Moreover, this two data rate detector scheme can also be employed for the purpose of enabling the wake up receiver to switch the mode of operation—between, for example, sleep mode and active mode as described hereinabove. Thus, when a first data rate is received, master receiver 25 is to be switched into active mode, while master receiver 25 is to be put into sleep mode when a second data rate is received.

In a further alternate embodiment of the present invention, a mixer 65 is employed. Mixer 65 is coupled between first envelope detector 60 and second bandpass filter 70. Mixer 65 is used to provide a means for frequency translating the first BB signal. The extent of the translation performed by mixer 65 corresponds to the local oscillator. The local oscillator, having a clock rate of $f_1$, provides a reference oscillating signal to the mixer 65.

Figure 4:
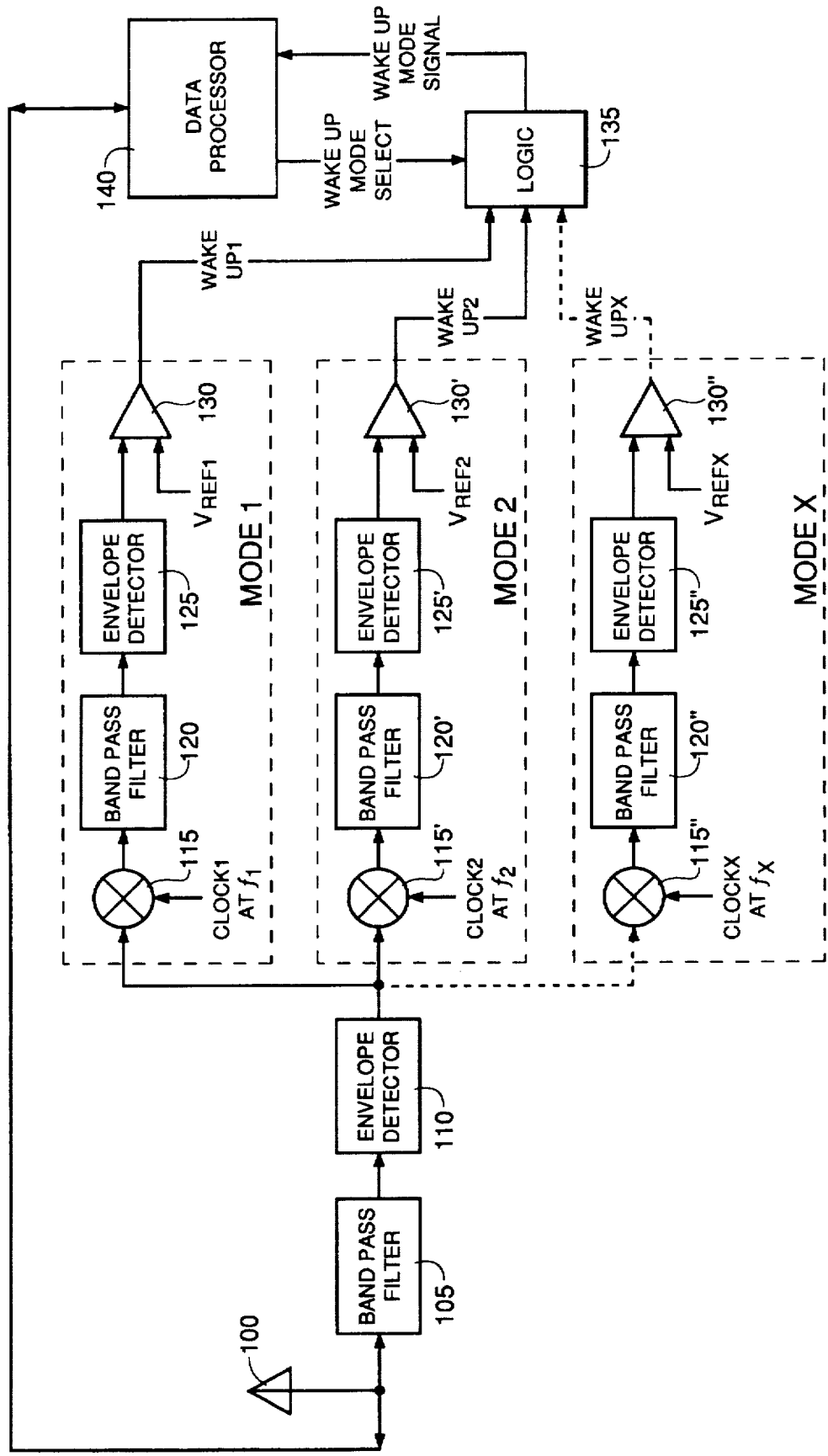
FIG. 4 illustrates a second embodiment of the present invention.

Referring to FIG. 4, an alternate embodiment of the present invention is illustrated. The architecture disclosed here is a further development of the embodiment of FIG. 3. Here, three data rate detectors are employed. The third data rate detector, being coupled to the frequency detector, receives a first BB signal generated by a first envelope detector 110. The third data rate detector can be designed in an identical fashion as the first and second data rate detectors described herein.

By this arrangement, comparator 103" triggers an internal WAKE_UPX signal which is input into control logic 135, which is coupled with a data processor 140, for waking up the master receiver 25. By employing three data rate detectors, the wake up receiver can switch the data rate to be detected from the wake up signal. Here, switching logic 135 in combination with data processor 140 recognize the data rate to be detected from the wake up signal. Subsequently, when a change is necessary, a third data rate is selected as being the data rate to be detected from the wake up signal for the purpose of waking master receiver 25.

In still another embodiment of the present invention, a modulation detector (not shown) is further incorporated for detecting a modulation scheme. In this embodiment, the wake up signal must also comprise a modulation format or formats. As such, the modulation detector can detect a modulation scheme selected from the group including at least amplitude modulation, frequency modulation, amplitude shift key modulation, phase shift key modulation, frequency shift key modulation, and multiphase frequency shift key modulation. The modulation detector can be realized by a variety of designs known to one of ordinary skill in the art. Thus, upon receiving the wake up signal, the modulation detector detects the format of the wake up signal and responds accordingly.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. For example, it should be obvious to one of ordinary skill in the art that either or both first and second communication devices, such as transmitter 10 and receiver 25, can further comprise transceiver properties for the purposes of the present invention. It is therefore contemplated that the appended claims will cover any such modifications or embodiments as fall within the true scope of the invention.

All of the U.S. patents cited herein are hereby incorporated by reference as if set forth in their entirety.

What is claimed is:

1. An electrical communications receiver which transitions from a sleep mode to an active mode upon receiving one or more specific electrical signals, the receiver consuming less electrical power in the sleep mode than in the active mode, comprising:
   a) an antenna for receiving an RF signal;
   b) a wake-up receiver circuit, coupled to the antenna, which operates when the communications receiver is in the sleep mode, including
      i) an RP bandpass filter, connected to receive the RF signal from the antenna, for detecting when the RF signal has a predetermined carrier frequency,
      ii) an envelope filter, connected to receive an RF signal from the RF bandpass filter, for demodulating the RF signal so as to output a baseband signal, and
      iii) a data rate detector which detects when the baseband signal has a predetermined data rate; and
   c) a switch for changing the communications receiver from the sleep mode to the active mode when both the RF bandpass filter detects said predetermined carrier frequency and the data rate detector detects said predetermined data rate.

2. An electrical communications system comprising:
   (1) an electrical communications receiver having a sleep mode and an active mode, the receiver consuming less electrical power in the sleep mode than in the active mode, wherein the receiver includes
      a) a receiver input for receiving an RF signal;
      b) a wake-up receiver circuit, coupled to the receiver input, which operates when the communications receiver is in the sleep mode, including
         i) an RF bandpass filter, connected to receive the RF signal from the receiver input, for detecting when the RF signal has a predetermined carrier frequency, and for outputting a bandpass filtered RF signal:
         ii) an envelope filter, connected to receive the bandpass filtered RF signal from the RF bandpass filter, for demodulating the bandpass filtered RF signal so as to output a baseband signal, and
         iii) a data rate detector which detects when the baseband signal has a predetermined data rate; and
      c) a switch for changing the communications receiver from the sleep mode to the active mode when both the RF bandpass filter detects said predetermined carrier frequency and the data rate detector detects said predetermined data rate; and
   (2) an electrical communications transmitter which transmits to the receiver, while the receiver is in its sleep mode, a signal having said predetermined carrier frequency and said predetermined wake-up data rate so as to put the receiver into its active mode, and which transmits data to the receiver while the receiver is in its active mode.

3. An electrical communications receiver, comprising:

a master receiver circuit having a sleep mode and an active mode such that the master receiver circuit continuously and uninterruptibly consumes substantially less power in the sleep mode than in the active mode;

a receiver input for receiving an RF signal;

a wake-up receiver circuit which operates when the communications receiver is in the sleep mode, including an RF bandpass filter, connected to receive the RF signal from the receiver input, for detecting when the RF signal has a predetermined carrier frequency, and for outputting a bandpass filtered RF signal;

an envelope filter for demodulating the bandpass filtered RF signal from the RF bandpass filter so as to output a baseband signal, and a data rate detector which detects when the baseband signal has a predetermined data rate; and a switch for changing the master receiver circuit from the sleep mode to the active mode when both the RF bandpass filter detects said predetermined carrier frequency and the data rate detector detects said predetermined data rate.

* * * * *